S. N. McCLEAN.
VEHICLE WHEEL AND TIRE.
APPLICATION FILED NOV. 12, 1908.
1,015,238.
Patented Jan. 16, 1912.
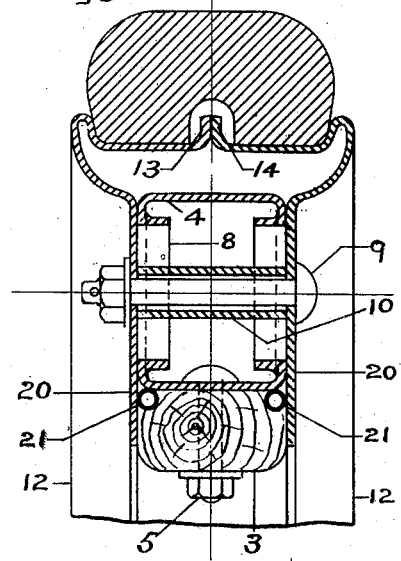
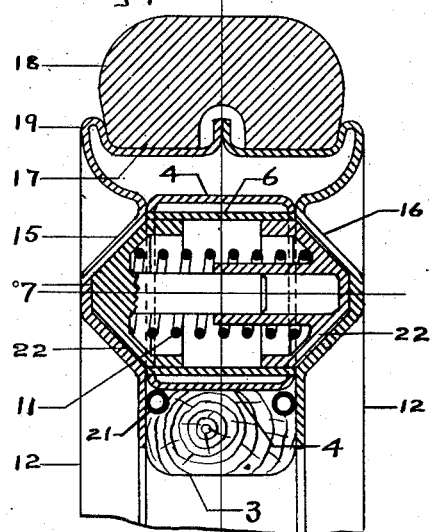
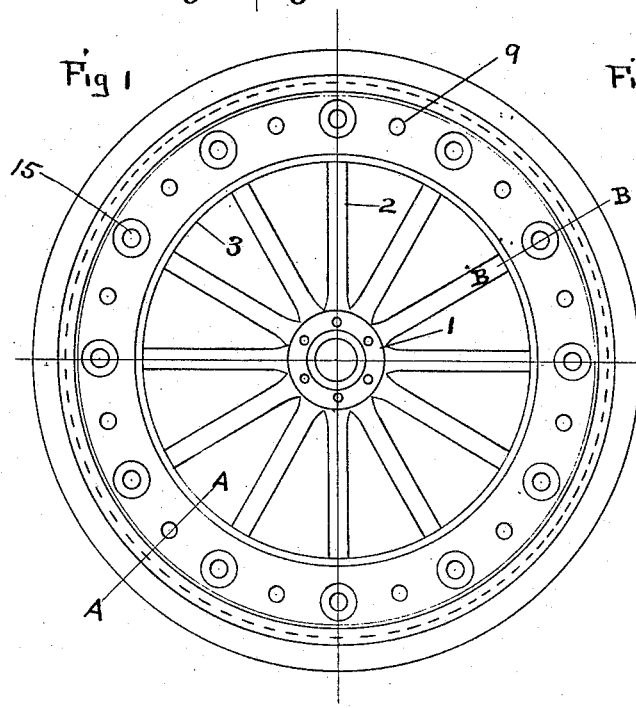
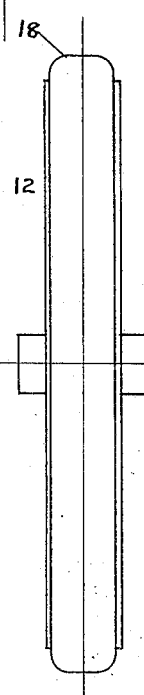
Witnesses
William Cavanagh
O. Doutt
Inventor
Samuel N. McClean

UNITED STATES PATENT OFFICE.

SAMUEL N. McCLEAN, OF CLEVELAND, OHIO.

VEHICLE WHEEL AND TIRE.

1,015,238. Specification of Letters Patent. Patented Jan. 16, 1912.

Application filed November 12, 1908. Serial No. 462,234.

*To all whom it may concern:*

Be it known that I, SAMUEL N. MCCLEAN, residing in the city of Cleveland, in the county of Cuyahoga and State of Ohio, have made certain new and useful Improvements in Vehicle Wheels and Tires, of which the following is a specification.

My invention relates to resilient vehicle wheels and tires, and the object of the invention is to construct a vehicle wheel, or vehicle tire, with an outer and inner casing, and to interpose between the outer and inner casing a plurality of spring-pressed cones, or spring-pressed parts, for controlling the resiliency of the wheel or tire.

A more specific object is to construct a vehicle tire which may be applied to any type of vehicle, and to construct the tire of an outer and inner part, the inner part carrying a plurality of springs and a plurality of spring-compressing means carried by the tire and engaging with the springs to control the resiliency of the wheel.

A further object is to construct a vehicle tire having an outer and inner part, a plurality of springs and spring-actuating means carried by the inner part of the tire and engaging with the outer part of the tire to automatically, simultaneously and coöperatively control the resiliency of the tire.

A further object is to construct a cam-actuated, resilient tire or wheel.

In the accompanying drawings, which are hereby made part of this specification, I have illustrated my invention as applied to a common type of automobile, or vehicle wheel, constructed with a resilient tire. The drawings are for purpose of illustration and do not illustrate the precise form and limits of the invention, and it is apparent that many different forms of the invention may be made in applying it to different types of vehicles and to different uses, without departing from the spirit of the invention, and I do not limit myself to the precise form herein described.

Figure 1 is a side elevation of a common type of automobile wheel, equipped with the invention. Fig. 2 is an end elevation of Fig. 1. Fig. 3 is a transverse section of the tire on the line A—A of Fig. 1. Fig. 4 is a transverse section of the tire on the line B—B of Fig. 1.

The foregoing described drawings are hereby submitted and made part of this specification.

In Fig. 1, I have illustrated my invention constructed as a resilient tire applied to the common type of automobile wheel. Generically described, the tire is constructed with an outer and an inner part. The inner part is formed to carry a plurality of spring-pressed cones, and the outer part is constructed with companion cone seats which engage with the spring-pressed cones to control the resiliency of the wheel, and to compel the cones to coöperate and act in unison in controlling the resiliency.

The inner part of the tire is fixedly attached to the wheel, and the outer part of the tire is movably, or operatively connected with the inner part, and the spring-pressed cones, or cams, are interposed between the outer and inner parts of the tire to control the resiliency of the wheel, and the cams are constructed to co-act in unison for distributing the resiliency and carrying the weight entirely around the wheel.

In the illustrations, 1 is the hub of the wheel, 2, the spokes, and 3, the wooden felly, and these parts of the wheel may be of any preferred form, or construction, for adapting the invention to the different types of vehicles, and to the different types of wheels.

The inner part of the wheel, 4, is illustrated in Figs. 3 and 4 as a square hoop, or tube, which is formed to be shrunk on to the wooden felly 3 in the usual manner, and may be fixedly connected with the felly by the tire bolts 5.

The tire 4 may be formed from a piece of round tubing which is passed through suitable rollers for compressing it into a square shape and forming it into a round ring or tire of the size required for the wheel to which the invention is applied. The ends of this tire 4 are then electric-welded to each other, thus integrally forming the inner part of the tire as a hollow, square, tubular ring. The inner part or member of the tire is provided with a plurality of transverse tubular openings 6, which form hollow, cylindrical housings to receive and retain the cones 7.

There are various ways of forming the tubes 6, and, as an illustration of one way, I have shown them as formed from sections of tubing which are passed through openings in the tire 4 and brazed or welded to the tire. The tire 4 is also constructed with flanged openings 8 through which the bolts 9 pass for fixedly retaining the outer and inner parts of the tire in operative correlation with each other. These openings 8 are of sufficient size to permit the required resilient movement of the outer part of the tire without bringing the bolts 9 into contact with the flanges of the openings 8. The bolts 9 are also formed with sleeves 10 which form shoulders for fixedly and operatively connecting the outer parts of the tire with each other and with the bolt 9.

The cones 7 are constructed as hollow cylinders having a conical end, and a central, inwardly projecting stem, or tube. The conical end of the cone 7 is flattened at its outer end, and the size and pitch of the cone is determined by the resiliency, and the operation, or burden, which the cone is intended to carry. The opposing cones 7 are essentially similar to each other, and are constructed to slide out and in in the tube 6, and the central stems of these cones are constructed to telescope or slide back and forth over each other to control the reciprocating action of the cones.

The springs 11, as shown in Fig. 4, are carried between the cones and may be of any size, stiffness, or tension, to control the resiliency, and to adapt the tire to the load, or weight, which the vehicle, or wheel, is intended to carry.

The cones 7 and springs 11, being movably and operatively retained in the tubes 6, the tire may be assembled, or disassembled, by removing the bolts 9, and thus permitting the outer part of the tire to be removed, and the cones and springs assembled or disassembled, or new springs inserted, when required.

The outer part of the tire 12, as shown in Figs. 1, 3 and 4, is formed of separate halves which may be connected to each other in any desired manner. As shown in Figs. 3 and 4, these halves 12 are formed from pressed steel, and as shown are connected by the flanges 13 and 14. They are provided with a plurality of cone seats 15 and 16, and these seats are formed opposite to each other and engage with the cones 7 to control the resiliency of the wheel. The flanges 13 and 14 may be bolted, riveted, or otherwise connected with each other to permit the opposite sides of the tire 12 to be removed from each other for assembling and disassembling the parts of the tire. The outer part of the tire is also formed with a circumferential groove 17 to retain the solid rubber tire 18 when it is desired to use a rubber tire in connection with the invention, and the retaining flanges 19 engage with the solid rubber tire for properly retaining it in position on the wheel.

The outer halves of the tire 12 are preferably formed from resilient sheet steel, and are pressed into the flanged shape shown in Figs. 3 and 4 for the purpose of obtaining the required stiffness, and lightness of the outer part of the tire, and these opposite sides 12 are formed with inwardly projecting sides, or flanges, 20, which are operatively connected with the inner part of the tire 4, and engage with the packing rings, or tubes, 21, to close and operatively protect the inner part of the tire from water and dust and rust, and to retain a suitable oil or lubricant within the tire and between the opposing cones 7 and tubes 6, and permit it to pass out through the openings 22 and lubricate the cone seats 15 and 16.

The packings 21 are preferably formed as hollow, pneumatic tubes, which may be pumped up with an air tension for fully and operatively controlling their action as gaskets, or packings.

The invention, when applied to a vehicle wheel, as shown in Figs. 1, 3 and 4, may be assembled and disassembled by removing the bolts 9 and removing the rubber tires 18, thus permitting the outer parts of the tire 12 to be removed, and the cones 7 and springs 11 may then be easily removed or inserted into the tubes 6, thus permitting the tire to be easily applied to a modern, common type of automobile, and new cones or springs inserted in the tire 4, this operation permitting the pneumatic packing tubes 21 to be inserted or removed, or be pumped up for tightening them.

The inner part of the tire 4 may be shrunk on to the wooden felly 3 on the ordinary vehicle by the usual process of heating, or it may be pushed on by pressure, and the tire bolts 5 may be inserted or removed through the openings 8 for assembling or disassembling this part of the invention.

The operation of the invention has been set forth in connection with the description of the operating parts.

The operation of the invention as a whole may be briefly described as follows: When the invention is applied to a vehicle wheel, as shown in Fig. 1, the outer part of the tire resting on the ground, causing the weight of the vehicle to press the inner part of the wheel down on all the cones 7 entirely around the wheel, and this pressure pushes the cones 7 in and causes them to compress the springs 11. The cone seats 15 and 16, by slipping past the cones 7, push them in and cause the resilient or spring-pressed movement between the inner part of the tire 4 and the outer part of the tire 12. The rolling, or turning of the wheel under its burden or movement, causes all the cones 7 to be pushed in and yield whenever the wheel strikes a bump or uneven part of the surface on which the wheel contacts and over which it rolls, thus causing the springy and resilient movement of the outer part of the tire. When the invention is applied to vehicles or wheels using brakes, the outer part of the tire has a resilient movement past the cones 7 both vertical and in a rotary or turning direction, and when the brakes are applied strong enough to cause the outer part of the tire to slip, or be retarded on the surface over which the wheel is turning and contacting, the slipping or retarding action of the brakes has a tendency to compress the cones and causes a resilient or yielding action of the brakes in retarding and controlling the wheel.

Further attention is called to the fact that the surface of the conical plunger heads and their complementary conical seats are surfaces of revolution whereby the contact of movement between them is a rolling contact thereby reducing the friction between the parts to a minimum.

The cones and cone seats being alike on all sides, or in all directions around the cone, causes the resilient action of the tire to yield and operate in a great variety of movements which the wheel encounters in passing over the irregularity of the surface with which it contacts, and especially so in motor vehicles, such as the common type of automobile, traction vehicles, street cars, and railroad cars, to all of which vehicles the invention is particularly applicable.

The effect of the inward movement of the cones, whether due to the weight of the vehicle, the action of the brakes or the rotation of the axle by the engine lessens the extent of contact with the cone seat, but the cones and cone seats are always in contact at points on a line having a definite relation to the direction of the force acting on the wheel. For instance, when the vehicle is at rest the cones and cone seats are in contact at points on the periphery of the cones at the ends of perpendicular radii, the points of contact being in this case on a line parallel with the direction of the force; i. e., the weight of the vehicle, acting on the wheel. As the wheel rotates the points of contact remain on the same lines, although they move around the cones, being always at the points which, at the particular instant, are at the ends of perpendicular radii. So also where the axle is rotated to propel the vehicle the point of each cone with its seat is at all times constant in a line having a definite relation to the direction of the rotation of the driving member of the wheel, that is, the inner member of the tire. By reason of the contact of the cone and cone seat being constant and on a line having a definite relation to the direction of the force transmitted, the weight of the vehicle is supported and the resiliency is utilized to both carry the weight and transmit the driving force.

In applying the invention to an eighty ton locomotive and heavy trucks of various kinds, the wheel can be formed with a large number of cones.

Having now fully described my invention and its mode of operation, what I claim as my invention and desire to secure by Letters Patent of the United States, is as follows:

1. In a resilient wheel, inner and outer rim members, one of said rim members being provided in its sides with a plurality of cone seats, the other member carrying a plurality of transversely extending spring pressed cones engaging said seats.

2. In a resilient wheel, inner and outer substantially rigid rim members, one of said rim members having radially extending side flanges provided with a plurality of cone seats, the other of said rim members carrying a plurality of transversely extending spring pressed cones engaging said seats.

3. In a resilient tire, inner and outer substantially rigid rim members, the outer one of said rim members having side plates provided with a plurality of cone seats, the other of said rim members consisting of a ring having its inner face cylindrical and carrying a plurality of transversely extending spring pressed cones engaging said cone seats.

4. In a resilient tire, inner and outer rim members, one of said rim members having radially extending side flanges provided with a plurality of pairs of oppositely arranged cone seats, the other of said rim members being arranged between said side flanges and carrying a plurality of pairs of oppositely arranged transversely extending spring pressed cones engaging said seats.

5. In a resilient tire, inner and outer substantially rigid rim members, one of said rim members having side plates provided with a plurality of pairs of oppositely arranged cone seats, the other member being arranged between said side plates and carrying a plurality of transversely extending spring pressed cones engaging said seats, one of the cones of each pair being provided on its inner side with a tubular extension and the other cone being provided on its inner side with a pin adapted to extend into said tubular extension.

6. A resilient tire comprising an inner and an outer member relatively movable, the outer member comprising a tire rim provided with side plates having a plurality of cone seats formed therein, the inner member provided with a plurality of spring-pressed cones engaging the cone seats in the outer member, the inner member also having transverse openings betwen the spring-pressed cones, transverse bolts connecting the side plates with the outer member and passing through the openings in the inner member, the transverse bolts having a limited movement in the transverse openings in the inner member of the tire and adapted to engage with the inner member to rotate or drive the tire.

7. A resilient tire formed with an outer and an inner member relatively movable, the outer member provided with separable side plates connected with the tire rim and having a plurality of cone seats formed therein, the inner member extending between the side plates and being provided with a plurality of spring-pressed cones engaging the cone seats of the outer member, cross bolts connecting the side plates and provided with means for retaining and releasing the side plates, and a suitable packing interposed between the outer and inner members of the tire.

SAMUEL N. McCLEAN.

Witnesses:
WILLIAM CAVANAGH,
V. O. COCHRAN.

---

Copies of this patent may be obtained for five cents each, by addressing the "Commissioner of Patents. Washington, D. C."